United States Patent
Van Tienen et al.

(10) Patent No.: US 10,805,405 B2
(45) Date of Patent: Oct. 13, 2020

(54) METHOD FOR NETWORK CHANGE TOLERANT SERVICE DISCOVERY IN A COMPUTER NETWORK

(71) Applicant: Robert Bosch GmbH, Stuttgart (DE)

(72) Inventors: Stephan Van Tienen, Bergen op Zoom (NL); Tom De Brouwer, Breda (NL); Marc Smaak, Bergen op Zoom (NL)

(73) Assignee: Robert Bosch GmbH, Stuttgart (DE)

( * ) Notice: Subject to any disclaimer, the term of this patent is extended or adjusted under 35 U.S.C. 154(b) by 534 days.

(21) Appl. No.: 14/782,918

(22) PCT Filed: Apr. 9, 2013

(86) PCT No.: PCT/EP2013/057351
§ 371 (c)(1),
(2) Date: Oct. 7, 2015

(87) PCT Pub. No.: WO2014/166522
PCT Pub. Date: Oct. 16, 2014

(65) Prior Publication Data
US 2016/0057236 A1 Feb. 25, 2016

(51) Int. Cl.
*G06F 15/16* (2006.01)
*H04L 29/08* (2006.01)
*H04L 29/12* (2006.01)
*H04L 12/24* (2006.01)
*H04L 12/931* (2013.01)

(52) U.S. Cl.
CPC .......... *H04L 67/16* (2013.01); *H04L 41/5058* (2013.01); *H04L 49/201* (2013.01); *H04L 61/1511* (2013.01); *H04L 61/1541* (2013.01)

(58) Field of Classification Search
CPC .......... H04L 67/00; H04L 67/16; H04W 76/19
USPC ................................... 709/227, 223
See application file for complete search history.

(56) References Cited

U.S. PATENT DOCUMENTS

| | | | |
|---|---|---|---|
| 9,107,164 B1* | 8/2015 | Troyanker | H04W 52/0229 |
| 2003/0103521 A1* | 6/2003 | Raphaeli | H04B 3/542 |
| | | | 370/445 |
| 2006/0101026 A1* | 5/2006 | Fukushima | H04L 29/06 |

(Continued)

FOREIGN PATENT DOCUMENTS

| CN | 101473597 A | 7/2009 |
|---|---|---|
| CN | 101611609 A | 12/2009 |

OTHER PUBLICATIONS

"RFC 6762—Multicat DNS", S. Cheshire, Apple. inc. Feb. 2013.*
V. Tewari, N. Dagdee, I. Singh, N. Garg and P. Soni, "An Improved Discovery Engine for Efficient and Intelligent Discovery of Web Service with Publication Facility," 2009 World Conference on Services—II, Bangalore, 2009, pp. 63-70. (Year: 2009).*

(Continued)

*Primary Examiner* — Oscar A Louie
*Assistant Examiner* — Messeret F Gebre
(74) *Attorney, Agent, or Firm* — Michael Best & Friedrich LLP

(57) ABSTRACT

Method and computer network for discovering services in a computer network using Domain Name System Service Discovery (DNS-SD), comprising as components at least a client and a server, the components can be linked by bridges and communicate by a network protocol, whereby the client and the server have a connection-oriented communication path between each other in the computer network, whereby in case of a connection loss one of the components being affected by the connection loss announces itself regularly using DNS-SD until the connection to the client is restored.

5 Claims, 3 Drawing Sheets

(56) References Cited

U.S. PATENT DOCUMENTS

| | | | | |
|---|---|---|---|---|
| 2006/0184661 | A1* | 8/2006 | Weisman | G06F 9/4411 709/224 |
| 2007/0150570 | A1 | 6/2007 | Eastham | |
| 2008/0076434 | A1* | 3/2008 | Shigaki | H04W 36/08 455/442 |
| 2009/0031381 | A1* | 1/2009 | Cohen | H04L 29/08846 725/115 |
| 2009/0259755 | A1 | 10/2009 | Boucachard et al. | |
| 2009/0264162 | A1* | 10/2009 | Ramachandran | H04W 52/243 455/572 |
| 2010/0029375 | A1* | 2/2010 | Buchholz | G07F 17/32 463/25 |
| 2010/0211878 | A1 | 8/2010 | Spijkerbosch et al. | |
| 2013/0286942 | A1* | 10/2013 | Bonar | H04B 7/0689 370/328 |
| 2014/0040490 | A1* | 2/2014 | Harris | H04W 76/00 709/229 |
| 2014/0059594 | A1* | 2/2014 | Stein | H04N 21/6405 725/33 |
| 2017/0264974 | A1* | 9/2017 | Harrison | H04L 63/10 |

OTHER PUBLICATIONS

Qing-Ju Jiao, Huang, Y., & Hong-Bin Shen. (2011). Large-scale mining co-expressed genes in *Arabidopsis anther*: From pair to group. Computational Biology and Chemistry, 35(2), 62-8. doi:http://dx.doi.org/10.1016/j.compbiolchem.2011.01.003 (Year: 2011).*

M. Nidd, "Timeliness of service discovery in DEAPspace," Proceedings 2000. International Workshop on Parallel Processing, Toronto, Ontario, Canada, 2000, pp. 73-80. (Year: 2000).*

International Search Report for Application No. PCT/EP2013/057351 dated Dec. 3, 2013 (3 pages).

Cheshire et al., "DNS-Based Service Discovery; rfc6763.txt," Apple Inc., Internet Engineering Task Force, IETF, Standard, Feb. 20, 2013, pp. 1-49.

Cheshire et al., "Multicast DNS; rfc6762.txt," Apple Inc., Internet Engineering Task Force, IETF, Standard, Feb. 20, 2013, pp. 1-70.

Mockapetris, "RFC1035—Domain Names—Implementation and Specification," Networking Group Request for Comments, Nov. 1, 1987, pp. 1-55.

* cited by examiner

METHOD FOR NETWORK CHANGE TOLERANT SERVICE DISCOVERY IN A COMPUTER NETWORK

BACKGROUND OF THE INVENTION

The invention provides for a method of discovering services in a computer network being tolerant of network changes.

A computer network is a collection of computers and electronic devices interconnected by communication channels like the internet allowing for sharing of resources and information. Communication protocols define the rules and data formats for exchanging information in such a network. A well known communication protocol is the Internet Protocol Suite.

The Internet Protocol Suite is a set of communication protocols used for the Internet and similar networks, and generally the most popular protocol stack for wide area networks. It is commonly known as TCP/IP, because of its most important protocols: Transmission Control Protocol and Internet Protocol, which were the first network networking protocols defined in this standard.

In a network in which multiple TCP/IP-enabled systems operate, systems will typically offer services. In order to find out which system offers which service, DNS (Domain Name System)-based Service Discovery (DNS-SD) can be used. The Domain Name System Service Discovery (DNS-SD) is an extension on the common Domain Name System.

SUMMARY OF THE INVENTION

It will be understood that the features mentioned above and those described hereinafter can be used not only in the combination specified but also in other combinations or on their own, without departing from the scope of the present invention.

BRIEF DESCRIPTION OF THE DRAWINGS

The invention is diagrammatically illustrated in the drawings by means of embodiments by way of example, and is hereinafter explained in detail with reference to the drawings. It is understood that the description is in no way limiting on the scope of the present invention and is nearly an illustration of embodiments of the invention.

DETAILED DESCRIPTION

The Domain Name System is a distributed naming system for any resource connected to the internet. The system associates various information with domain names assigned to each of the participants. Furthermore, it translates domain names to the numerical IP addresses needed for locating computer services and devices.

DNS-SD can be used in two different ways.

Multicast DNS:

Multicast DNS is a standard for using Domain Name System programming interfaces, packet formats and operating without configuring a conventional DNS server.

With multicast DNS (mDNS) each server multicasts the services it offers. These offers will be sent with an exponential back-off timer with a maximum of 8 messages. Next to sending the broadcast, it will react on any explicit query for the service it offers.

A client can send a multicast query for a certain service to all servers, servers which offer requested service will react on this query. The query will have an exponential back-off timer with a suggested maximum of 60 minutes.

Using mDNS allows a client to determine the IP address of a given host without the direct help of a centralised DNS server.

Unicast DNS:

Unicast DNS uses a server as storage location for the services offered within a network. Instead of multicast all servers now use unicast messaging to register which services they are offering. This is the more scalable solution since it involves less multicast traffic on the network.

A client now will set up a long lived query with the storage server for services it is interested in. This way it gets updates about device offering the service.

Both solutions have their limitations in keeping the lists of devices offering services catches up to date with respect to existence in the real world.

In a client-server based TCP/IP system, client will often communicate to one or multiple servers. The communication to these servers can be executed using a connection-less or connection-oriented protocol. In case of a connection-oriented protocol the client and servers are mutually aware of the fact that they can communicate with each other, i.e. they will notice when the communication path between each other is lost.

Multicast DNS

Problem

Figure 1:
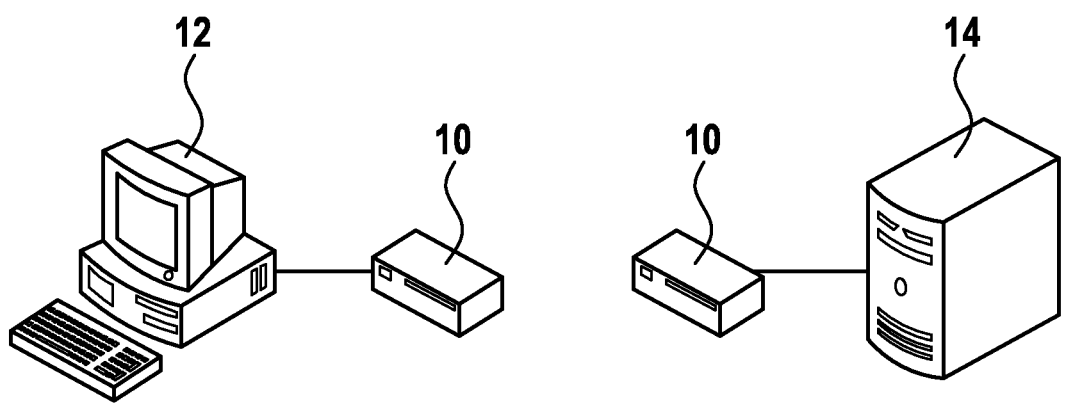
FIG. 1 shows a computer network.

FIG. 1 shows an example of an arrangement comprising bridges 10, a client 12, and a server 14, being stable for 52 minutes multicast query is sent out at 0:00:01, 0:00:03, 0:00:06, 0:00:12, 0:00:24, 0:00:48, 0:01:36, 0:03:12, 0:06:24, 0:12:48, 0:25:36, 0:51:12, 1:51:12, 2:51:12), only every hour the client 12 will send out a query due to the exponential back-off timers.

Figure 2:
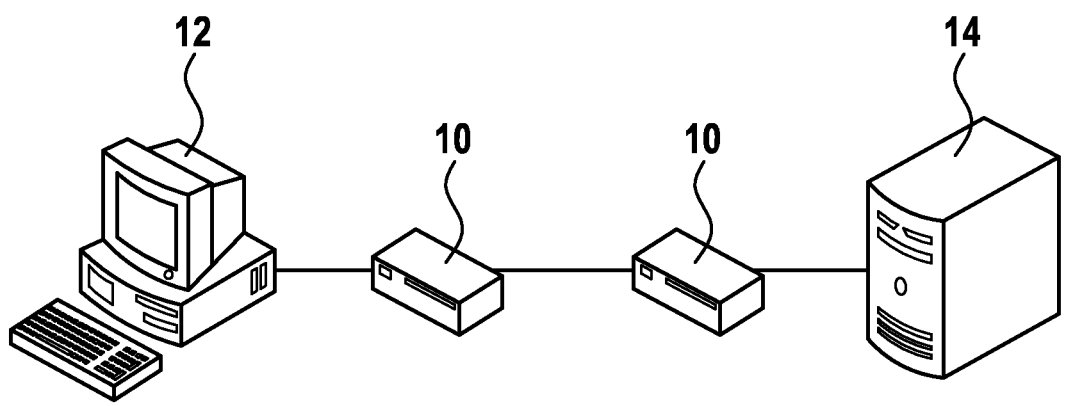
FIG. 2 shows the computer network of FIG. 1 with connected bridges.

In case a connection is made between both bridges 10 after 0:51:13 as shown in FIG. 2, it will take up to an hour before the client 12 will notice the server 14. This means, at time=1:51:12 the client 12 will send out a query message for the service the server 14 offers, on which the server 14 will respond. The maximum wait time of one hour is usually not acceptable for users of the service.

Solution

In a centrally-controlled network, there will always be a connection-oriented path between the client (the central controller) and the server. The server can verify if this connection exists. If the server detects a connection loss, because the connection between the two bridges 10 is lost, it will announce itself regularly as it concludes that its network connectivity has changed in a relevant way. According to the Internet-Draft, the server is allowed to update its records with a maximum of 10 times per minute.

In case the client detects the connection loss, also in case the connection between both bridges 10 is lost, it immediately removes the device from its DNS-SD cache. Therefore, the client will not try to reconnect to the server until it is reported again.

In case the connection between both bridges is restored again the client will quickly discover the server and can reconnect to the service it is providing. The server will stop its regular announcements as it has concluded that its network connectivity is connected again.

Alternatively, the server always announces itself regularly if there is no connection to a client. This way quick discovery works as well as no connection was present between the bridges during startup of client and server.

The disadvantage of this is that there is no more network load when there is no connection between the client and the server since all servers will start announcing themselves frequently. However, this is no issue since no useful information is sent on the network when the controller is not present.

Figure 3:
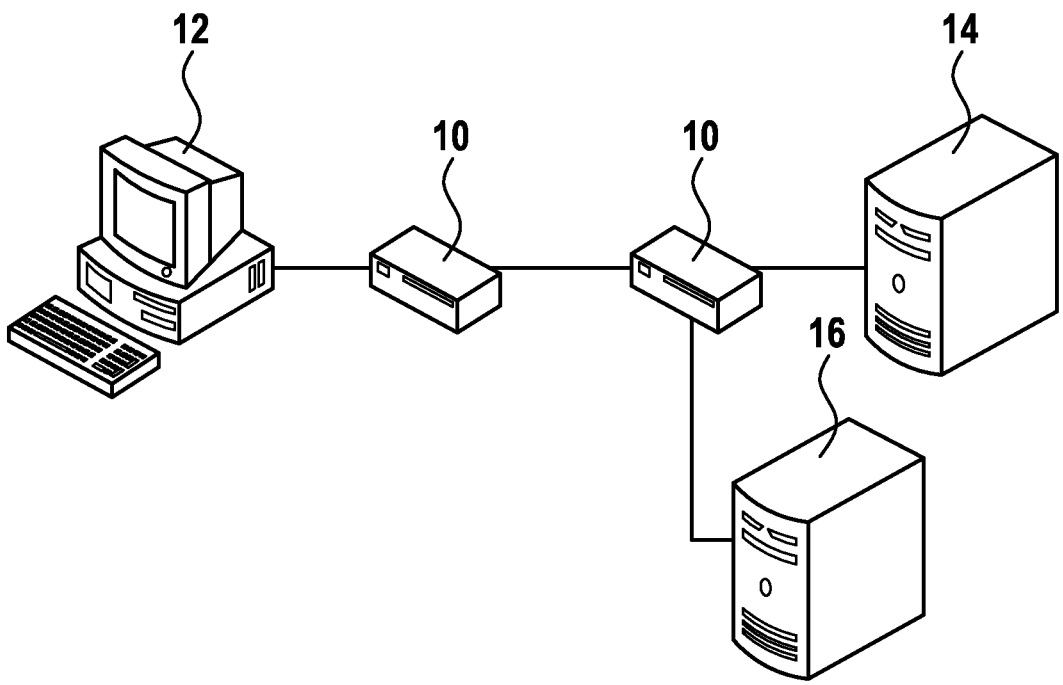
FIG. 3 shows another computer network.

Unicast DNS-Network Connectivity Loss Client (Central Controller)<-->DNS Storage Server Problem The set-up in FIG. 3 shows a correct network for unicast DNS with bridges 10, a client 12, a server 14, and a DNS storage server 16. As described before, the client will have an outstanding long lived query with the DNS storage server 16. These messages are delivered via UDP (User Datagram Protocol), which has no guarantee of delivery.

Figure 4:
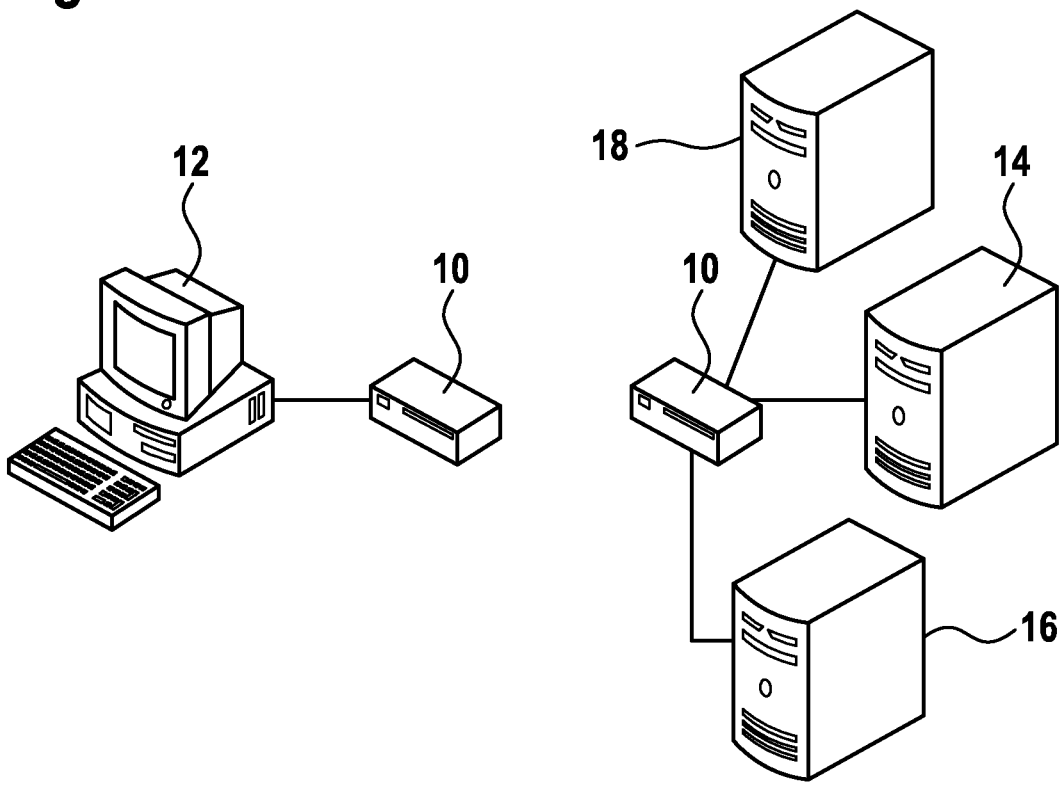
FIG. 4 shows a computer network with an additional server.

FIG. 4 shows a system in which an additional server 18 is connected at the time no connection is available between the DNS storage server 16 and the client 12. The DNS storage server 16 will send out a long-lived query update to the client 12, this message will never arrive, the DNS storage server 16 will not get any feedback from this event so it will not retry it. The client 12 will not notice that there is no connection to the DNS storage server 16 and misses this event since it uses UDP.

Whenever the connection is restored between the two bridges 10, the newly added server 18 is never found, because only updates are sent.

Solution

At the time the client sets up an LLQ (Long-Lived Query) with the DNS storage server, it should set up as well a keep-alive mechanism. This means, it should send every x seconds a message on a separate connection-oriented communication path to the DNS storage server. The DNS storage server will answer the message. Whenever the message is missed for a few times, the client must wait for the connection to be re-established. Once the connection is re-established the client should refresh its DNS-SD cache by restarting the LLQ at which time the information at the client will be up-to-date again.

Unicast DNS-Network Connectivity Loss Between Server<-->DNS Storage Server

Problem

Figure 5:
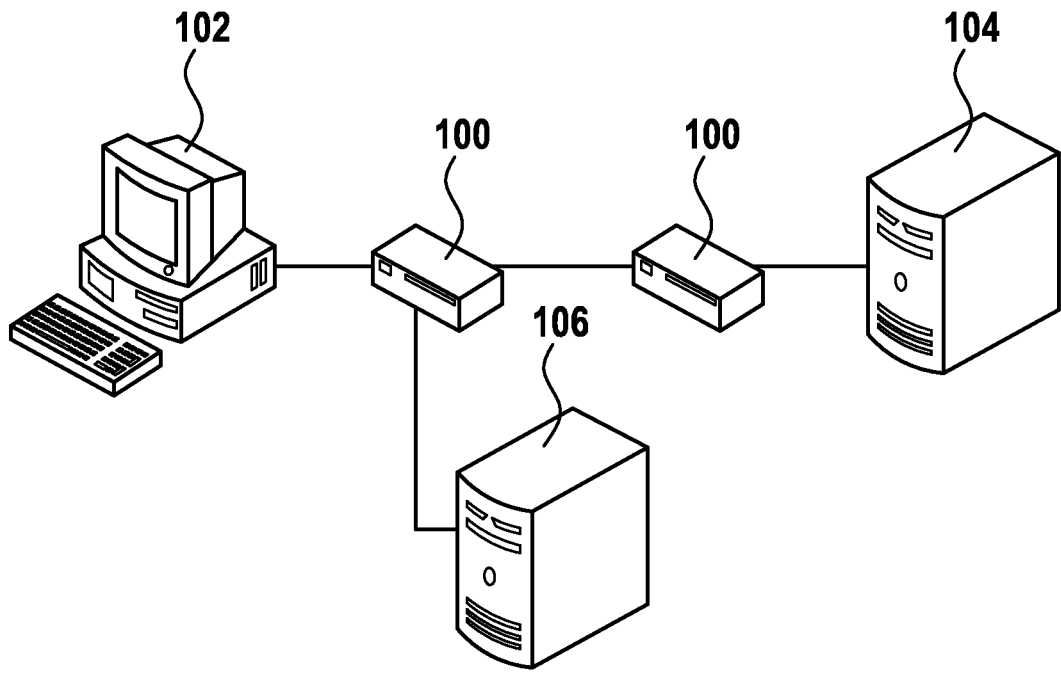
FIG. 5 shows another computer network.

The client in a system which uses a DNS storage server as record storage can never fully trust the cache of the DNS storage server. In FIG. 5, a correct setup is shown with bridges 100, a client 102, a server 104, and a DNS storage server 106.

Figure 6:
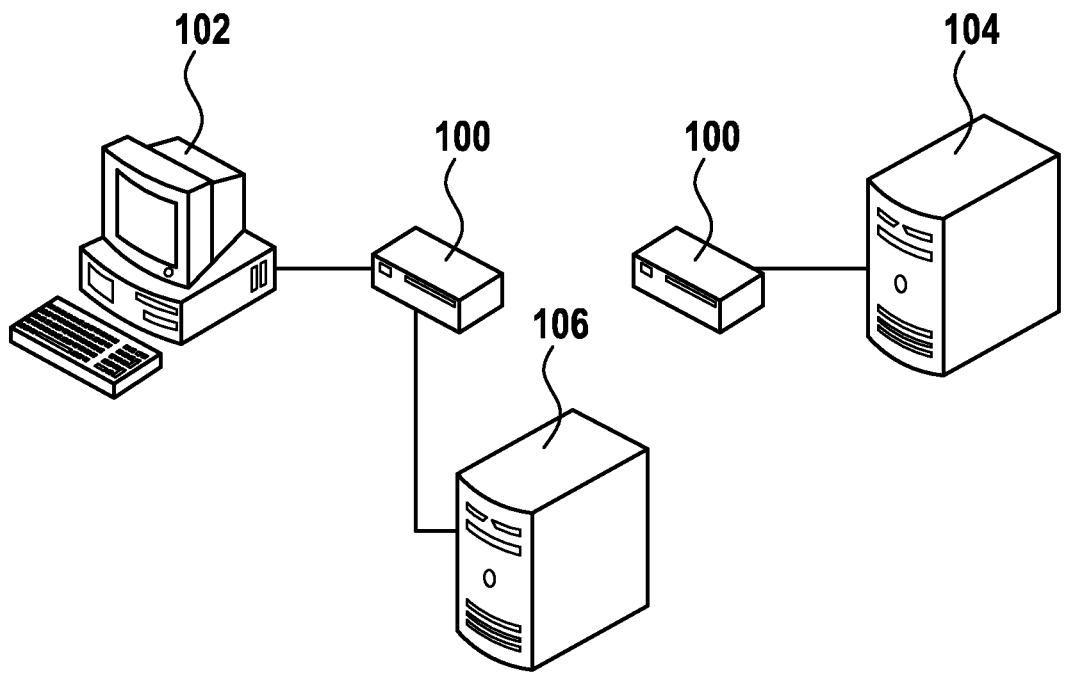
FIG. 6 shows the computer network of FIG. 5 with disconnected bridges.

The DNS storage server 106 will have the DNS records of the server 104. These records are stored with a certain time-to-live. The server 104 is responsible for refreshing the records at the DNS storage server 106. Only when the time-to-live is timed out, the records will be reported lost to the client 102. Whenever, as shown in FIG. 6, the link is lost between the two bridges 100, the client 102 will lose the connection to the server 104. The DNS storage server 106 still has the record during the time the time-to-live is not aged out. Since this time to live is usually quite long, minutes or even hours, the client 102 will use the outdated cache information during this time.

When the link is restored after the record at the DNS storage server 106 is aged out, the client 102 received an update that the server 104 was lost. At the time the link is restored again, the server 104 will update the DNS storage server 106 with its records at the default refresh time. Whenever the connection is restored within the aging out time, so before the DNS storage server 106 informs the client 102 that the server 104 is gone via the LLQ, no update will be received at the client side. Therefore, the client 102 does not know that it can reconnect to the server 104.

Solution

In a centrally-controlled network, there will always be a connection-oriented communication path between the client 102 (the central controller) and the server 104.

The server 104 will notice that its connection is lost. At the time the server 104 notices that the connection is lost, it should reannounce its records with the DNS storage server 106. It has to make sure that the remove and add of its records are received by the DNS storage 106 by receiving an acknowledgement. In this case, the server 104 knows that the client 102 did receive a remove event and an add event via the LLQ mechanism. The client 102 can reconnect to the server 104 after it has seen the remove and add event.

With implementing one, two or all of the mechanism described above the service discovery of services in a connection-oriented system is much more stable.

The invention claimed is:

1. A method for discovering services in a computer network using Domain Name System Service Discovery (DNS-SD), the computer network having multiple components and including a first client and a first server, the method comprising:

linking at least some of the components by bridges;

establishing a connection-oriented communication path between the first client and the first server, wherein in the connection-oriented communication path the first client and the first server are mutually aware that they can communicate with each other, wherein the first client maintains a DNS-SD cache listing at least some of the components in the computer network with which the first client can communicate;

sending and receiving at least one communication between the first server and the first client via the connection-oriented communication path;

detecting, by the first server, a connection loss between the first server and the first client and, in response to detecting the connection loss with the first client, announcing itself regularly using DNS-SD until the connection to the first client is restored;

detecting, by the first server, that the connection between the first server and the first client has been restored and, in response to detecting that the connection between the first client and the first server has been restored, stopping the regular announcing, wherein the first client and the first server that are connected to each other after the connection is restored are the same first client and the same first server that were connected to each other before the connection loss; and detecting, by the first client, that the connection between the first server and the first client has been restored by detecting an announcement from the first server and, in response to detecting that the connection between the first client and the first server has been restored, refreshing the DNS-SD cache maintained by the first client.

2. The method according to claim 1, further comprising detecting, by the first client, the connection loss between the first client and the first server and, in response, removing the first server from the DNS-SD cache maintained by the first client.

3. A method for discovering services in a computer network using Domain Name System Service Discovery (DNS-SD), the computer network having multiple components and including a client and a DNS storage server, the method comprising:
   linking at least some of the components by bridges;
   maintaining, by the client, a DNS-SD cache listing at least some of the components in the computer network with which the client can communicate based on messages received from the DNS storage server via a Long-Lived Query (LLQ) established between the client and the DNS storage server;
   monitoring, by the client, the presence of the DNS storage server by sending messages to the DNS storage server to which the DNS storage server responds;
   detecting, by the client, a connection loss between the client and the DNS storage server in response to not receiving a response from the DNS storage server;
   detecting, by the client that the connection between the client and the DNS storage server has been restored in response to receiving a response from the DNS storage server after detecting the connection loss; and
   refreshing the DNS-SD cache maintained by the client by restarting the Long-Lived Query (LLQ) with the DNS storage server in response to detecting that the connection between the DNS storage server and the client has been restored.

4. The method according to claim 3, further comprising:
   detecting, by a server, a connection loss to the client; and
   repeatedly transmitting, by the server, an announcement to the DNS storage server until the DNS storage server acknowledges the announcement.

5. A computer network comprising:
   multiple components including a first client and a first server, the components linked by bridges and communicating via a network protocol, wherein at least some of the components are linked by bridges;
   wherein the first client and the first server are configured to
      establish a connection-oriented communication path between the first client and the first server, wherein in the connection-oriented communication path the first client and the first server are mutually aware that they can communicate with each other, wherein the first client maintains a DNS-SD cache listing at least some of the components in the computer network with which the first client can communicate, and
      send and receive at least one communication between the first server and the first client via the connection-oriented communication path,
   wherein the first server is further configured to
      detect a connection loss between the first server and the first client and, in response to detecting the connection loss with the client, announce itself regularly using DNS-SD until the connection to the client is restored, and
      detect that the connection between the first server and the first client has been restored and, in response to detecting that the connection between the first client and the first server has been restored, stop the regular announcing, wherein the first client and the first server that are connected to each other after the connection is restored are the same first client and the same first server that were connected to each other before the connection loss, and
   wherein the first client is further configured to
      detect that the connection between the first server and the first client has been restored by detecting an announcement from the first server and, in response to detecting that the connection between the first client and the first server has been restored, refresh the DNS-SD cache maintained by the first client.

* * * * *